United States Patent [19]
Latham et al.

[11] Patent Number: 5,968,133
[45] Date of Patent: Oct. 19, 1999

[54] ENHANCED SECURITY NETWORK TIME SYNCHRONIZATION DEVICE AND METHOD

[75] Inventors: Daren Wayne Latham, Ham Lake; Mark P. Gooderum, Blaine; Glenn Andreas, Fridley, all of Minn.

[73] Assignee: Secure Computing Corporation, Roseville, Minn.

[21] Appl. No.: 08/782,887

[22] Filed: Jan. 10, 1997

[51] Int. Cl.$^6$ ...................................................... H04L 7/00
[52] U.S. Cl. .......................... 709/248; 709/220; 709/228; 709/243; 714/12; 714/34
[58] Field of Search ............................ 395/200.5, 200.58, 395/200.73, 200.78, 182.1, 183.1

[56] References Cited

U.S. PATENT DOCUMENTS

| | | | |
|---|---|---|---|
| 3,956,615 | 5/1976 | Anderson et al. | 235/61.7 B |
| 4,177,510 | 12/1979 | Appell et al. | 364/200 |
| 4,584,639 | 4/1986 | Hardy | 364/200 |
| 4,621,321 | 11/1986 | Boebert et al. | 364/200 |
| 4,701,840 | 10/1987 | Boebert et al. | 364/200 |
| 4,713,753 | 12/1987 | Boebert et al. | 364/200 |
| 4,914,568 | 4/1990 | Kodosky et al. | 364/200 |
| 5,272,754 | 12/1993 | Boebert | 380/25 |
| 5,276,735 | 1/1994 | Boebert et al. | 380/21 |
| 5,689,566 | 11/1997 | Nguyen | 380/25 |

FOREIGN PATENT DOCUMENTS

| | | | |
|---|---|---|---|
| 0 554 182 A1 | 4/1993 | European Pat. Off. | H04L 29/06 |
| 0 743 777 A2 | 11/1996 | European Pat. Off. | H04L 29/06 |
| 96/13113 | 5/1996 | WIPO | H04L 29/06 |
| 97/13340 | 4/1997 | WIPO | H04L 9/00 |
| 97/16911 | 5/1997 | WIPO | H04L 29/06 |

OTHER PUBLICATIONS

International Search Report, PCT Application No. PCT/US 95/12681, 8 p. (mailed Apr. 9, 1996).

Atkinson, R., "IP Authentication Header", Network Working Group, Request For Comment No. 1826, http//ds.internic.net/rfc/rfc1826.txt, 9 p. (Aug. 1995).

Atkinson, R., "IP Encapsulating Security Payload (ESP)", Network Working Group, Request For Comment No. 1827, http//ds.internic.net/rfc/rfc1827.txt, 12 p. (Aug. 1995).

Atkinson, R., "Security Architecture for the Internet Protocol", Network Working Group, Reqest for Comment No. 1825, http//ds.internic.net/rfc/rfc1825.txt, 21 p. (Aug. 1995).

Baclace, P.E., "Competitive Agents for Information Filtering", *Communications of the ACM*, 35, 50 (Dec. 1992).

Badger, L., et al., "Practical Domain and Type Enforcement for UNIX", Proceedings of the 1995 IEEE Symposium on Security and Privacy, p. 66–77 (May 1995).

Bevier, W.R., et al., "Connection Policies and Controlled Interference", *Proceedings of the Eighth IEEE Computer Security Foundations Workshop*, Kenmare, Ireland, pp. 167–176 (Jun. 13–15, 1995).

Bowen, T.F., et al., "The Datacycle Architecture", *Communications of the ACM*, 35, 71–81 (Dec. 1992).

Bryan, J., "Firewalls For Sale", *BYTE*, pp. 99–100, 102, 104–105 (Apr. 1995).

(List continued on next page.)

*Primary Examiner*—Zarni Maung
*Assistant Examiner*—Saleh Najjar
*Attorney, Agent, or Firm*—Schwegman, Lundberg, Woessner & Kluth, P.A.

[57] ABSTRACT

An external portion or burb of a host computer receives messages from external servers representative of accurate time from one or more peer computers coupled by a network. A process called a client on the external burb processes the messages and then accurately sets a host computer clock. Processes called servers running on an internal burb which may not communicate directly with peers, then access the clock to obtain a correct indication of network time without having to communicate directly with the peer computers. The time is then provided to internal clients. This allows a host computer without an expensive clock to update its clock and enable it to provide accurate time to processes running on the host.

29 Claims, 3 Drawing Sheets

OTHER PUBLICATIONS

Karn, P., et al., "The ESP DES–CBC Transform", Network Working Group, Request for Comment No. 1829, http//ds.internic.net/rfc/rfc1829.txt, 9 p. (Aug. 1995).

Kent, S.T., "Internet Privacy Enhanced Mail", *Communications of the ACM,* 36, 48–60 (Aug. 1993).

Lampson, B.W., et al., "Dynamic Protection Structures", *AFIPS Conference Proceedings,* 35, 1969 Fall Joint Computer Conference, Las Vegas, NV, 27–38 (Nov. 18–20, 1969).

Lee, K.C., et al., "A Framework for Controlling Cooperative Agents", *Computer,* 8–16 (Jul. 1993).

Loeb, S., "Architecting Personalized Delivery of Multimedia Information", *Communications of the ACM,* 35, 39–48 (1992).

Loeb, S., et al., "Information Filtering", *Communications of the ACM,* 35, 26–28 (Dec. 1992).

Merenbloom, P., "Network 'Fire Walls' Safeguard LAN Data from Outside Intrusion", *Infoworld,* p. 69 & addnl page (Jul. 25, 1994).

Metzger, P., et al., "IP Authentication using Keyed MD5", Network Working Group, Request for Comments No. 1828, http//ds.internic.net/rfc/rfc1828.txt, 5 p. (Aug. 1995).

Obraczka, K., et al., "Internet Resource Discovery Services", *Computer,* 8–22 (Sep. 1993).

Peterson, L.L., et al., In: *Computer Networks,* Morgan Kaufmann Publishers, Inc., San Francisco, CA, pp. 218–221, 284–286 (1996).

Press, L., "The Net: Progress and Opportunity", *Communications of the ACM,* 35, 21–25 (Dec. 1992).

Schroeder, M.D., et al., "A Hardware Architecture for Implementing Protection Rings", *Communications of the ACM,* 15, 157–170 (Mar. 1972).

Schwartz, M.F., "Internet Resource Discovery at the University of Colorado", *Computer,* 25–35 (Sep. 1993).

Smith, R.E., "Constructing a High Assurance Mail Guard", Secure Computing Corporation (Appeared in the Proceedings of the National Computer Security Conference), 7 p. (1994).

Smith, R.E., "Sidewinder: Defense in Depth Using Type Enforcement", *International Journal of Network Management,* pp. 219–229 (Jul.–Aug. 1995).

Stadnyk, I., et al., "Modeling User's Interests in Information Filters", *Communications of the ACM,* 35, 49–50 (Dec. 1992).

Stempel, S., "IpAccess—An Internet Service Access System for Firewall Installations", *IEEE,* 31–41 (1995).

Stevens, C., "Automating the Creation of Information Filters", *Communications of the ACM,* 35, 48 (Dec. 1992).

Thomsen, D., "Type Enforcement: The New Security Model", *SPIE,* 2617, 143–150 (1995).

Warrier, U.S., et al., "A Platform for Heterogeneous Interconnection Network Management", *IEEE Journal on Selected Areas in Communications,* 8, 119–126 (Jan. 1990).

White, L.J., et al., "A Firewall Concept for Both Control–Flow and Data–Flow in Regression Integration Testing", *IEEE,* 262–271 (1992).

Wolfe, A., "Honeywell Builds Hardware for Computer Security", *Electronics,* 14–15 (Sep. 2, 1985).

Mills, D.L., "Network Time Protocol (Version 3) Specification, Implementation and Analysis", University of Delaware Network Working Group, 1–48, (Mar. 1992).

ENHANCED SECURITY NETWORK TIME SYNCHRONIZATION DEVICE AND METHOD

FIELD OF THE INVENTION

The present invention relates to synchronization of clocks in a network and in particular to updating a system clock in a more secure manner.

BACKGROUND OF THE INVENTION

Networks connect many computers together allowing them to exchange date via communications lines. Several standards defining how such date exchanges should occur have been developed and implemented to ensure that computer and computer programs using the same protocols can successfully exchange data. One of the problems associated with the ability to exchange data is ensuring that the security of a computer attached to such a network is safe from attack by someone who is not authorized to access the computer. There has been an explosion in the growth of computer networks as organizations realize the benefits of networking their personal computers and workstations. Increasingly, these networks are falling prey to malicious outsiders who hack into the network, reading and sometimes destroying sensitive information. Exposure to such attacks has increased as companies connect to outside networks such as the Internet.

A common communication on networks, such as the Internet, are messages relating to ensuring that computers are set to the proper time. This is important in time stamping further communications and in ensuring that time triggered events occur when desired. Extremely accurate clocks are expensive, and not many computers have them. Thus, when a process running on a computer needs to have the correct time, it may need to ask for the time from a different source.

To facilitate the setting of time in computers attached to the Internet, a Network Time Protocol (NTP) standard has been established. It provides a way for all clocks in computers on a network to be synchronized. A formal specification of NTP version 3 is described in RFC1305, which is published in many places on the Internet, and implemented by many computer owners to synchronize the clocks on their computers.

At a high level, software called a client, on one computer sends a NTP message to one or more servers which are thought to have accurate time. The client then processes the replies, which contain information representative of the correct time. The client then determines the server time with respect to local time and adjusts the local clock accordingly. In some implementations, multiple servers are asked for the time, and the replies are processed to account for delays and known errors. In general the approach involves mutually coupled oscillators and maximum-likelihood estimation and clock-selection procedures, together with a design that allows provable assertions on error bounds to be made relative to stated assumptions on the correctness of the primary reference sources. In essence, a system of distributed NTP peers operates as a set of coupled phase-locked oscillators, with an update algorithm functioning as a phase detector and the local clock as a disciplined oscillator, but with deterministic error bounds calculated at each step in the time-transfer process. This known process utilizes a NTP time stamp represented as a 64 bit unsigned fixed point number which allows precision to about 200 picoseconds.

NTP messages between multiple servers and a host attempting to update its clock, flow back and forth, sometimes at set intervals in the range of one minute or less if great accuracy is desired. One problem associated with such message traffic is that it does not protect against unauthorized access to the host attempting to update its time. NTP uses a simple transport protocol called User Datagram Protocol (UDP.) UDP is a protocol for processes to exchange datagrams such as time requests between processes coupled via Internet Protocol (IP.) One important feature of the UDP protocol is that there is no assurance that a message will get through. It is said to be an unreliable communications protocol for this reason. No continuous connection is established, and since there is no maintenance of the states of messages to ensure the delivery, there is very little overhead in implementing the UDP communication protocol. It also means that since there is no continuous connection, it is easier for someone to attempt unauthorized communication by simply sending message to a port that is known to be waiting for replies to a time request or proxy from any given process running on the host. There is a need to provide a safe way to provide an accurate indication of time to a process without exposing it to unauthorized access. There is also a need to synchronize a host's clock accurately with other accurate clocks on a network. There is a need to synchronize the host's clock in such a manner that does not have high overhead and does not allow unauthorized access to the host.

SUMMARY

An external portion or burb, of a host computer receives messages from external servers representative of accurate time from one or more computers coupled by a network. A process called a client on the external burb processes the messages and then accurately sets a host computer clock. Processes called servers running on an internal burb which may not communicate directly with processes on the external burb, then access the clock to obtain a correct indication of network time without having to communicate directly with the computers connected by network. The time is then provided to internal clients. This allows a host computer without an expensive clock to update its clock and enable it to provide accurate time to processes running on the host.

In one embodiment, the host computer is a standard Intel Pentium processor based personal computer having a real time clock chip. The personal computer runs a dual stack network separation program called Sidewinder currently marketed by the assignee hereof to provide security for computers coupled to networks. This provides type enforcement which prevents the internal burb from being accessed directly by external peer computers attached to a network such as the Internet. The clock is set by clients running either on the internal burb or the external burb, but normally by a client running on the external burb which has access to accurate time indications.

A client on the external burb can also be set to query time using User Datagram Protocol (UDP) messages from multiple external servers on a predetermined periodic basis. In one embodiment, several external servers known to have accurate time are sent requests every minute. The times are then received and processed in accordance with Network Time Protocol (NTP) to generate correct time. The correct time is then set in the system clock. Once set, the clock can provide accurate time to both internal clients and external clients on other computers on the network, through servers running in the external burb.

In a further embodiment, a method of determining time in a host coupled to at least two distinct networks having one or more accurate time keepers comprises requesting time from a first server on a first network via an entity operating in a first portion of a firewall system. A communication is then received in the first portion of the firewall system from the first server containing an indication of time. The clock register is then adjusted based upon the indication of time received from the first server. The clock register may then be read by entities operating in a second portion of the firewall system coupled to a second distinct network, which entities may not directly communicate with the entity operating in the first portion of the firewall system.

DESCRIPTION OF THE EMBODIMENTS

In the following detailed description of the embodiments, reference is made to the accompanying drawings which form a part hereof, and in which is shown by way of illustration specific embodiments in which the invention may be practiced. It is to be understood that other embodiments may be utilized and structural changes made without departing from the scope of the present invention.

Figure 1:
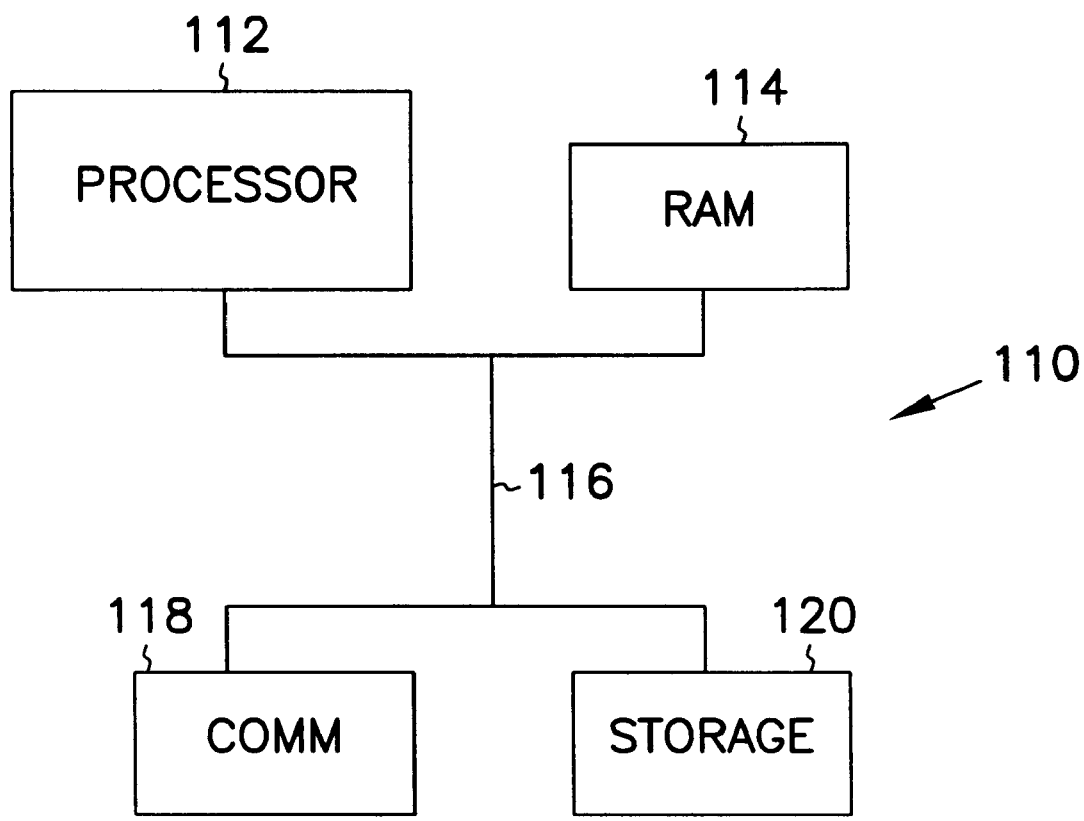
FIG. 1 is a block diagram of a computer system implementing the present invention.

In FIG. 1, a computer system 110 comprises a processor 112 coupled to a random access memory, RAM 114. While only a single bus 116 is shown connecting the RAM 114 and processor 112 to a communications port 118 and disk drive or other storage medium 120, it will be recognized by those skilled in the art that it represents several different busses in a standard personal computer architecture. The communications port represents various communications options in computer system 10, such as ethernet cards, modems, cable modems, ISDN and T1 interface cards and other communication devices.

Program code running on the computer system 110 from RAM 114 is used to communicate through a public network interface to a public network such as the Internet. It provides security features which will be discussed further with reference to FIG. 2. In one embodiment, the secure computer is an Intel Pentium-based machine running a hardened form of BSD/OS Unix. A system based on a 90 MHz Pentium microprocessor with 32 megabytes of memory, 2 gigabytes of hard disk space, a DAT tape for backup and a CD-ROM for software loads has been found to be adequate.

Figure 2:
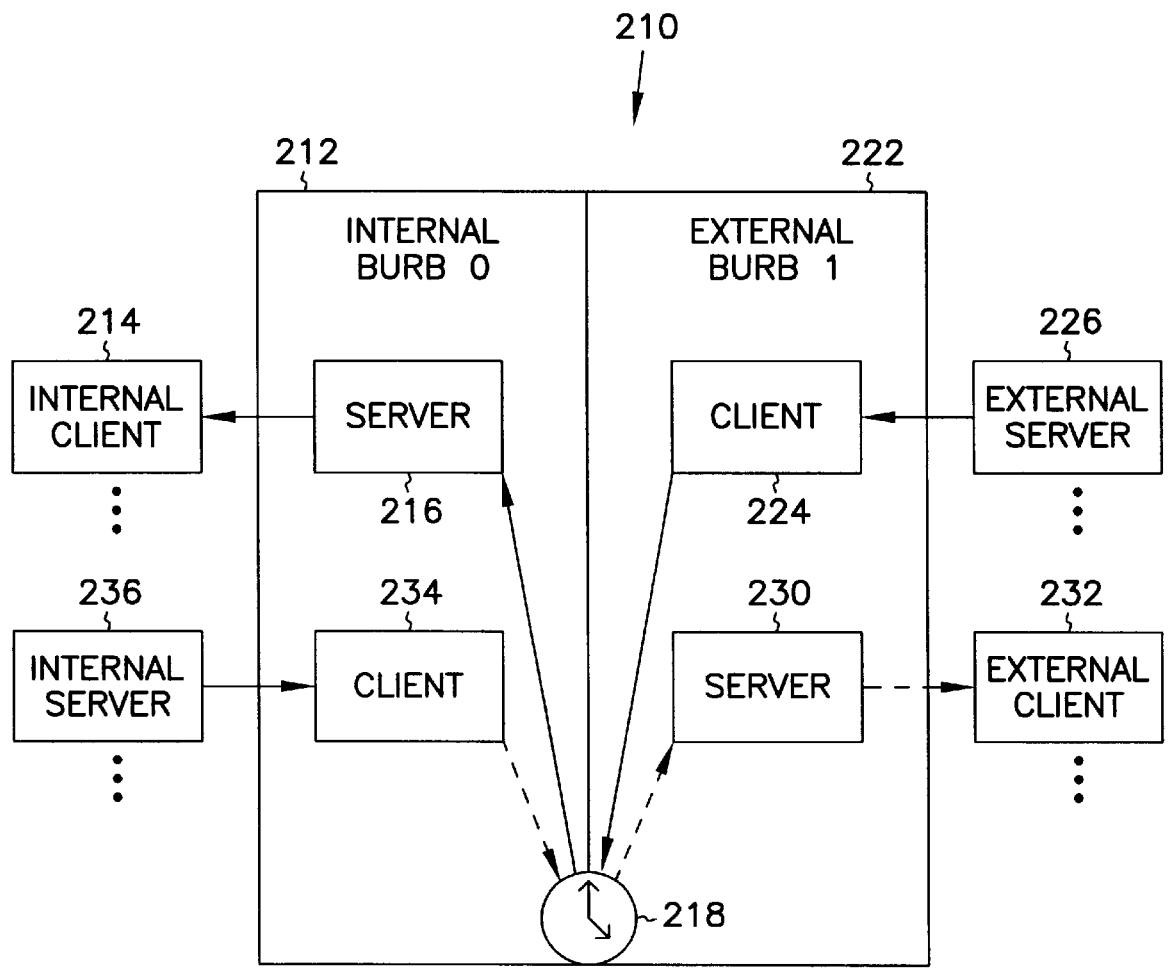
FIG. 2 is a block diagram of a computer system having an external portion which obtains and sets a system clock with accurate time.

In FIG. 2, a security architecture implemented on the computer system of FIG. 1 having internal and external sides or burbs is indicated generally at 210. FIG. 2 is preferably implemented as software which is stored on disk drive 120 and run or executed on processor 112 out of RAM 114. It should be noted that disk drive 120 is used herein to represent various storage medium by which software implementing architecture 210 may be stored and distributed. It also represents a communication medium in which the software may be temporarily stored while being transferred or transmitted to computer system 110. Processes running in either burb do not "talk" directly to processes in the other burb. They are referred to as typed. This type of architecture is described in "SYSTEM AND METHOD FOR PROVIDING SECURE INTERNETWORK SERVICES", U.S. patent application Ser. No. 08/322078 filed Oct. 12, 1994 and "SYSTEM AND METHOD FOR ACHIEVING NETWORK SEPARATION", U.S. patent application Ser. No. 08/599232 filed Feb. 9, 1996, now U.S. Pat. No. 5,864,683 and assigned to the same assignee as the present application, the discussion of both of which are hereby incorporated by reference. A system having internal and external burbs is currently being sold by the present assignee under the brand name, Sidewinder. The current invention provides an enhancement to such architecture and runs on the system of FIG. 1.

In FIG. 2, an internal burb 212 is coupled to internal clients 214 via a burb server 216. Burb server 216 obtains time from a system clock chip indicated at 218. The clock 218 comprises a register which is readable by server 216. Whenever an internal client 214 requests time, it specifies an address such as IP loopback address 127.0.0.1. The internal burb server 216 reads the register of clock 218 and provides the time therein to the internal client 214 using the loopback address.

The internal burb 212 is isolated from an external burb 222 by a dual stack structure described in the above incorporated application. This ensures that the external burb 222, cannot directly pass communications to the internal burb 212. The external burb 222 comprises an external burb client 224 which generates requests for time from external servers. It also specifies an address on which to reply, such as IP loopback address 127.1.0.1. Replies by external servers with an indication of time are received and processed by the external burb client 224 to provide an accurate indication of current time. This indication is then written into the register at clock 218. Note that other loopback addresses could be used if desired, but it must be one that the external servers are capable of handling.

In one embodiment where the external network comprises the Internet, Network Time Protocol (NTP) is used to accurately determine the time. The external burb client 224 sends NTP messages specifying the loopback address to one or more external servers 226 which are selected because of they are thought to have accurate time. For instance, they may be sites that have atomic clocks. The external burb client 224 then processes the replies, which contain information representative of the correct time. The client 224 then determines the server time with respect to local time and adjusts the local clock 218 accordingly. In some implementations, multiple servers are asked for the time, and the replies are processed to account for delays and known errors in a well known manner. This known process utilizes a NTP time stamp represented as a 64 bit unsigned fixed point number which allows precision to about 200 picoseconds. Such precision is more than adequate for almost all applications.

In a further embodiment, an external burb server 230 provides time to external clients 232. The external burb server 230 obtains time from the register of clock 218, which is kept fairly accurate by external burb client 224 updates. In yet a further embodiment, an internal burb client 234 obtains time from one or more internal servers 236 which are known to be accurate. It then sets the register in clock 218 with the correct time. UDP messages are used in both instances to communicate the time, using the same addresses as specified above. Note that other addresses may also be used to send and receive time updates.

Figure 3:
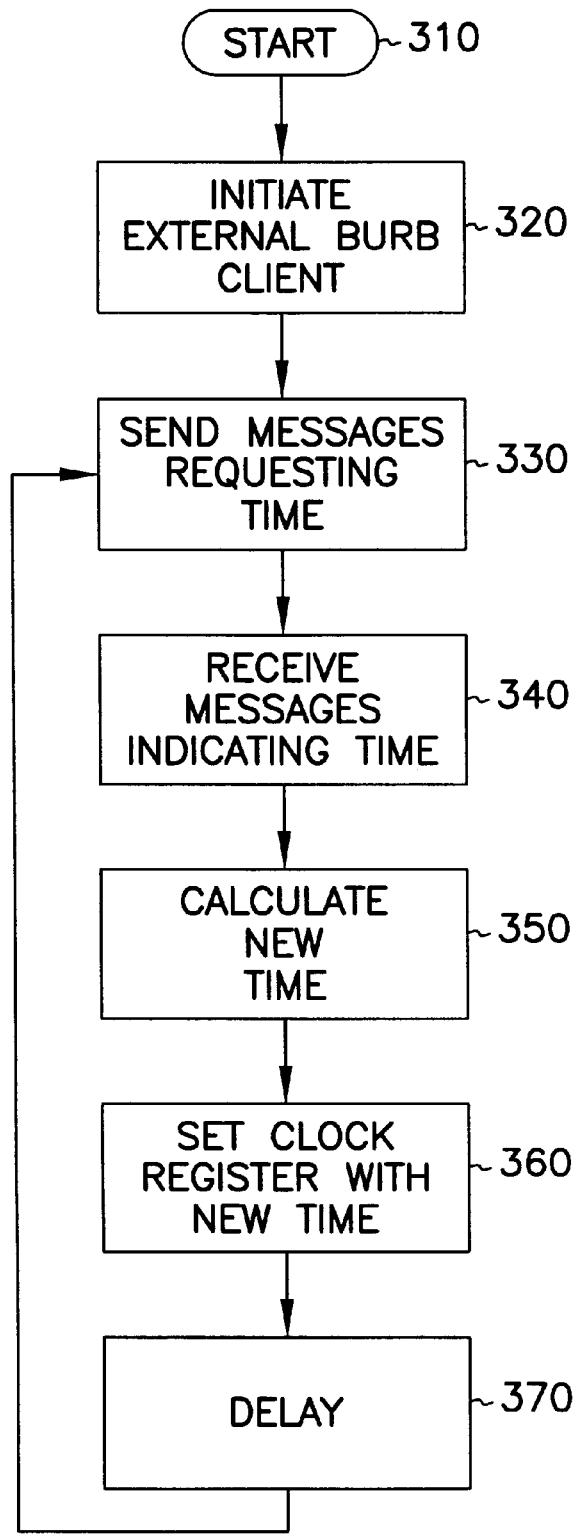
FIG. 3 is a flow chart representation of the operations performed by the external portion of the computer system of FIG. 2.

A flow chart representing a NTP daemon used to perform operations to determine accurate time in accordance with one embodiment of the invention is shown starting at 310 in FIG. 3. The daemon may be implemented in one or more modules of code, and in some embodiments may be at least partially hardwired. It is initiated at 320 with a time period defining the rate at which the clock 218 will be updated, and a list of time keepers, peers or other servers will be asked for the time. These sources are selected, based on how accurate the time is desired to be. Some clocks are known as truechimers which keep very accurate time in accordance with trusted standards. Others are known as falsetickers that do not keep accurate time. In addition, loopback addresses are specified, and a port, such as port 123 is bound in accordance with standard Internet UDP. At 330, messages are sent to the sources requesting the time. At 340, messages or packets are received back and may or may not be validated as desired based on knowledge of network restrictions, version number of the packet. If validation is on, packets not meeting the above criteria are thrown away. Time is then calculated at 350 and set at 360 taking into account known delays in accordance with NTP such that the clock register is set with a very accurate time indication. Only one client should be exclusively authorized to set the time so that there is no conflict. A delay period is waited through at 370 and then program flow is returned to block 330 to start the messaging for determining the correct time again. The delay period is selected based on the desired accuracy of the clock.

There are several different modes that a host may run in. These are sometimes referred to as peer associations. A first such association is a symmetric active association. A host in the this mode sends periodic messages to its peer regardless of the peer's Teachableness. This mode announces the host's willingness to synchronize and be synchronized. A second mode is referred to as symmetric passive. This association is created upon arrival of a message from a peer running in symmetric active mode. It only exists if the peer is reachable and the peer's stratum level is less than, or equal to the stratum level of the host. If this is not true, the association will be destroyed, but not until at least one message has been sent in reply. This mode is intended mainly for hosts located near the root. In a client mode, the host sends periodic messages to its peer regardless of the reachability of the peer. This mode announces that host's willingness to be synchronized by the peer, but not to synchronize the peer. A server mode is created upon the arrival of a request for time from a client. The association exists only to reply to that request after which the association is destroyed. This mode announces the hosts willingness to synchronize the peer, but not to be synchronized by the peer. Finally, a broadcast mode results in the sending of periodic messages regardless of the peer's reachableness or stratum. The host is willing to synchronize, but not be synchronized by others. In normal operation, one host operates in an active mode (symmetric active, client, or broadcast), while the other operates in a passive mode (symmetric passive or server). An error results when both peers operate in the same mode, unless that mode is symmetric active. In this mode, each peer will ignore messages from the other host. When the NTP daemon is using hosts running in broadcast mode, it need not send periodic message, but only wait to receive them in order to calculate and set a new time.

The NTP daemon is controlled by a configuration file, which has a format which may be similar to other Unix configuration files. There are several configurations possible:

Only sync the time to an external source.
Only sync the time to an internal source.
Sync the time to an external source, and serve time to internal clients.
Sync the time to an external source, and serve time to external clients.
Sync the time to an internal source, and serve time to internal clients.
Sync the time to an internal source, and serve time to external clients.
Sync the time to an external source, and serve time to internal and external clients.
Sync the time to an internal source, and serve time to internal and external clients.

The NTP daemon uses burbified configuration files and other files such as an authentication key file to generate, send, and receive NTP messages and to calculate and set time in accordance with NTP. Being burbified is meant to mean the segregation of a process into a burb and limiting how it can communicate with other processes in a different burb, such as by prohibiting direct communication. It provides a good level of security in a firewall system such as the Sidewinder system previously mentioned. A configuration command is used to modify the configuration file and cause the daemon to operate in accordance with the modification. A peer command is used to specify that the local server is to operate in symmetric active mode with a remote server. In this mode, the local server can be synchronized by the remote server, and the remote server can be synchronized by the local server. The peer command has arguments comprising an IP address of the host, a key index, a version number of 1, 2, or 3, and a prefer field marking the host as a preferred host chosen for synchronization among sets of correctly operating hosts. A server command specifies that the local server is to operate in client mode with a remote server whose IP address is specified in the command. In this mode, the local server can be synchronized to the remote server, but the remote server may never by synchronized to the local server. The server command has arguments comprising an IP address of the remote server, a key, a version number, and a prefer field. An enable command is used to enable various server options, and a disable command is also supported.

Several access control options are also provided. A restrict command is used to restrict a host from either serving time or receiving time. It specifies an IP address of the host, an IP mask to use on the address, and a flag describing the reason to restrict the host. Such reasons comprise none or more of ignoring all packets from the host, ignoring NTP queries and configuration queries, ignoring such queries attempting to modify the state of the server, treat normally, but don't use them as sync sources, and limit number of clients from the same network class on a first come first serve basis. Client limit and client period commands are also used to manage connections.

It is to be understood that the above description is intended to be illustrative, and not restrictive. While the invention has been described with reference to various embodiments, many other embodiments will be apparent to those of skill in the art upon reviewing the above description. For instance, the invention has been described mainly with reference to the UDP protocol for message exchange and NTP for determining correct time. The invention will also be useful with any other type of communications network and time determining protocols which might use different types of addressing and time calculation algorithms. The scope of the invention should, therefore, be determined with reference to the appended claims, along with the full scope of equivalents to which such claims are entitled.

What is claimed is:

1. A method of determining time in a host coupled to a network having one or more accurate time keepers comprising the steps of:

requesting time from an external server via an entity operating in an external portion of a firewall system;

receiving a communication in the external portion of the firewall system from the external server containing an indication of time; and adjusting a clock register based upon the indication of time received from the external server wherein the clock register may be read by entities operating in an internal portion of the firewall system which entities may not directly communicate with the entity operating in the external portion of the firewall system.

2. The method of claim 1 wherein the clock register is adjusted based upon the indication of time received from the external server and a delay known to be associated with receiving such indication of time.

3. The method of claim 1 wherein time is determined consistent with Internet Network Time Protocol.

4. The method of claim 1 wherein time is requested on a periodic basis.

5. The method of claim 1 wherein time is requested from plural external servers.

6. The method of claim 1 wherein communications received from an external server are validated prior to being used to adjust the clock register.

7. The method of claim 1 and further comprising the step of obtaining time from the clock register through an internal portion of the firewall system.

8. A storage medium having a computer program stored thereon for causing a suitably programmed host system to determine time from a network having one or more accurate time keepers, by performing the following steps when such program is executed on the system:

requesting time from an external server via the program operating in an external portion of a firewall in the system;

receiving a communication in the external portion of the firewall system from the external server containing an indication of time; and adjusting a clock register based upon the indication of time received from the external server wherein the clock register may be read by entities operating in an internal portion of the firewall system which entities may not directly communicate with the program operating in the external portion of the firewall system.

9. The storage medium of claim 8 wherein the computer program comprises programming for further causing the system to adjust the clock register based upon the indication of time received from the external server and a delay known to be associated with receiving such indication of time.

10. The storage medium of claim 8 wherein the computer program comprises programming for further causing the system to adjust the clock register consistent with Internet Network Time Protocol.

11. The storage medium of claim 8 wherein the computer program comprises programming for further causing the system to request time from plural external servers.

12. The storage medium of claim 8 wherein the computer program comprises programming for further causing the system to perform the following additional step when such program is executed on the system:

Validating received communications containing indications of time prior to using them to adjust the clock register.

13. A method of determining time in a host coupled to a network having one or more accurate time keepers comprising the steps of:

periodically requesting time from plural external servers via an entity operating in an external portion of a firewall system;

receiving communications in the external portion of the firewall system from the external servers containing an indication of time;

validating the communications received; and adjusting a clock register based upon authenticated indications of time received from the external servers wherein the clock register may be read by entities operating in an internal portion of the firewall system which entities may not directly communicate with the entity operating in the external portion of the firewall system.

14. The method of claim 13 wherein the entity operating in the external portion of the firewall system comprises a Network Time Protocol (NTP) daemon program which has exclusive authority to adjust the clock register in accordance with NTP.

15. The method of claim 13 wherein the daemon operating in the external burb of the firewall system comprises a Network Time Protocol (NTP) program which has exclusive authority to adjust the clock register in accordance with NTP.

16. A security system on a host computer coupled to an external network comprising:

an external portion that communicates with other systems coupled to the external network, at least one of which is capable of providing an indication of current time;

a process running in the external portion of the host computer that requests time from another system coupled to the external network and receives such indications of current time; and said process adjusting a clock register based upon the indication of time received from the external server wherein the clock register may be read by entities operating in an internal portion of the firewall system which entities may not directly communicate with the process operating in the external portion of the firewall system.

17. The security system of claim 16 wherein the clock register is adjusted based upon the indication of time received from the external server and a delay known to be associated with receiving such indication of time.

18. The security system of claim 16 wherein time is determined consistent with Internet Network Time Protocol.

19. The security system of claim 16 wherein time is requested on a periodic basis.

20. The security system of claim 16 wherein time is requested from plural external servers.

21. The security system of claim 16 wherein communications received from an external server are validated prior to being used to adjust the clock register.

22. The security system of claim 16 and wherein time is requested from the clock register through an internal portion of the firewall system.

23. A security system in a host coupled to a network having one or more accurate time keepers, the security system comprising:

a processor;

a memory coupled to the processor;

an external burb;

an internal burb;

a daemon operating as a client in the external burb that periodically requests time from plural external servers;

the daemon running from the memory on the processor that receives communications from the external servers containing a indications of time;

the daemon validating the communications received; and the daemon adjusting a clock register based upon authenticated indications of time received from the external servers wherein the clock register may be read by entities operating in an internal burb of the security system which entities may not directly communicate with the daemon operating in the external portion of the firewall system.

24. A method of determining time in a host coupled to at least two distinct networks having one or more accurate time keepers comprising the steps of:

requesting time from a first server on a first network via an entity operating in a first portion of a firewall system;

receiving a communication in the first portion of the firewall system from the first server containing an indication of time; and adjusting a clock register based upon the indication of time received from the first server wherein the clock register may be read by entities operating in a second portion of the firewall system coupled to a second distinct network, which entities may not directly communicate with the entity operating in the first portion of the firewall system.

25. The method of claim 24 wherein the clock register is adjusted based upon the indication of time received from the first server and a delay known to be associated with receiving such indication of time.

26. The method of claim 24 wherein time is determined consistent with Internet Network Time Protocol.

27. The method of claim 24 wherein time is requested on a periodic basis.

28. The method of claim 24 wherein time is requested from plural servers.

29. The method of claim 24 wherein communications received from a server are validated prior to being used to adjust the clock register.

* * * * *